United States Patent
Olmstead et al.

(10) Patent No.: US 7,499,090 B2
(45) Date of Patent: Mar. 3, 2009

(54) ROLLING-RESET IMAGER WITH OPTICAL FILTER

(75) Inventors: Bryan L. Olmstead, Eugene, OR (US); Alan Shearin, Eugene, OR (US)

(73) Assignee: Datalogic Scanning, Inc., Eugene, OR (US)

( * ) Notice: Subject to any disclaimer, the term of this patent is extended or adjusted under 35 U.S.C. 154(b) by 346 days.

(21) Appl. No.: 11/045,214

(22) Filed: Jan. 27, 2005

(65) Prior Publication Data

US 2006/0164541 A1    Jul. 27, 2006

(51) Int. Cl.
    *H04N 5/335* (2006.01)
(52) U.S. Cl. .................. 348/296; 348/142; 348/155; 348/370; 348/399.1; 348/342; 235/462.11; 235/462.25; 235/462.28; 235/462.41; 235/462.42; 359/740; 359/793
(58) Field of Classification Search .............. 348/91, 348/164, 296, 297, 335, 342, 370, 371, 230.1, 348/135, 142, 150, 155, 399.1; 359/740, 359/793, 795, 809, 16, 637; 235/462.1, 462.11, 235/462.12, 462.24, 462.25, 462.28, 462.32, 235/462.35, 462.41, 462.42, 454, 462.01, 235/462.16; 358/3.26
See application file for complete search history.

(56) References Cited

U.S. PATENT DOCUMENTS

| | | | |
|---|---|---|---|
| 3,614,310 A | 10/1971 | Korpel | |
| 4,082,431 A | 4/1978 | Ward | |
| 4,275,454 A | 6/1981 | Klooster | |
| 4,308,521 A | 12/1981 | Casasent et al. | |
| 4,804,249 A | 2/1989 | Reynolds et al. | |
| 4,864,249 A | 9/1989 | Reiffin | |
| 5,003,166 A | 3/1991 | Girod | |
| 5,010,412 A * | 4/1991 | Garriss | ........ 348/371 |
| 5,080,456 A | 1/1992 | Katz et al. | |
| 5,142,413 A | 8/1992 | Kelly | |
| 5,164,584 A | 11/1992 | Wike et al. | |
| 5,278,397 A | 1/1994 | Barkan et al. | |
| 5,307,175 A | 4/1994 | Seachman | |
| 5,315,095 A | 5/1994 | Marom et al. | |
| 5,331,143 A | 7/1994 | Marom et al. | |

(Continued)

FOREIGN PATENT DOCUMENTS

JP    56050469    5/1981

OTHER PUBLICATIONS

International Search Report for PCT/US06/03060, issued Jun. 8, 2006.

(Continued)

*Primary Examiner*—Lin Ye
*Assistant Examiner*—Chriss S Yoder, III
(74) *Attorney, Agent, or Firm*—Stoel Rives LLP

(57) ABSTRACT

An imaging system comprises a rolling-reset imager that forms an electronic image of an object, a light source illuminating the object with pulsed light, and a bandpass optical filter disposed between the object and the rolling-reset imager. The pulsed light has an illumination frequency spectrum and an illumination pulse width defining an effective exposure time for forming the image of the object. The bandpass optical filter has a frequency pass band permitting transmission of a significant portion of the illumination frequency spectrum while at least approximately inhibiting transmission of at least some light having frequencies outside the illumination frequency band.

25 Claims, 2 Drawing Sheets

U.S. PATENT DOCUMENTS

| | | | |
|---|---|---|---|
| 5,332,892 A | 7/1994 | Li et al. | |
| 5,347,121 A | 9/1994 | Rudeen | |
| 5,352,922 A | 10/1994 | Barkan et al. | |
| 5,354,977 A * | 10/1994 | Roustaei | 235/462.11 |
| 5,371,361 A | 12/1994 | Arends et al. | |
| 5,386,105 A | 1/1995 | Quinn et al. | |
| 5,418,356 A | 5/1995 | Takano | |
| 5,422,472 A | 6/1995 | Tavislan et al. | |
| 5,426,521 A * | 6/1995 | Chen et al. | 359/9 |
| 5,438,187 A | 8/1995 | Reddersen et al. | |
| 5,446,271 A | 8/1995 | Cherry et al. | |
| 5,475,208 A | 12/1995 | Marom | |
| 5,486,688 A * | 1/1996 | Iima et al. | 235/462.11 |
| 5,506,392 A | 4/1996 | Barkan et al. | |
| 5,583,342 A | 12/1996 | Ichie | |
| 5,623,137 A | 4/1997 | Powers et al. | |
| 5,625,495 A | 4/1997 | Moskovich | |
| 5,635,699 A | 6/1997 | Cherry et al. | |
| 5,646,390 A * | 7/1997 | Wang et al. | 235/454 |
| 5,646,391 A | 7/1997 | Forbes et al. | |
| 5,689,104 A * | 11/1997 | Suzuki et al. | 235/462.09 |
| 5,714,750 A | 2/1998 | Eastman et al. | |
| 5,717,194 A | 2/1998 | Forbes et al. | |
| 5,745,176 A * | 4/1998 | Lebens | 348/370 |
| 5,748,371 A | 5/1998 | Cathey et al. | |
| 5,756,981 A | 5/1998 | Roustaei et al. | |
| 5,770,847 A | 6/1998 | Olmstead | |
| 5,814,803 A | 9/1998 | Olmstead et al. | |
| 5,825,044 A | 10/1998 | Allen et al. | |
| 5,945,670 A | 8/1999 | Rudeen | |
| 6,011,660 A * | 1/2000 | Nagahara | 359/793 |
| 6,042,012 A | 3/2000 | Olmstead et al. | |
| 6,056,198 A | 5/2000 | Rudeen et al. | |
| 6,057,971 A | 5/2000 | Mihara | |
| 6,066,857 A | 5/2000 | Fantone et al. | |
| 6,069,738 A | 5/2000 | Cathey et al. | |
| 6,073,851 A | 6/2000 | Olmstead et al. | |
| 6,097,856 A | 8/2000 | Hammond | |
| 6,098,887 A | 8/2000 | Figarella et al. | |
| 6,142,376 A | 11/2000 | Cherry et al. | |
| 6,147,616 A | 11/2000 | Ori | |
| 6,152,371 A | 11/2000 | Schwartz et al. | |
| 6,164,540 A | 12/2000 | Bridgelall et al. | |
| 6,184,534 B1 * | 2/2001 | Stephany et al. | 250/459.1 |
| 6,209,788 B1 | 4/2001 | Bridgelall et al. | |
| 6,236,737 B1 * | 5/2001 | Gregson et al. | 382/103 |
| 6,256,067 B1 * | 7/2001 | Yamada | 348/370 |
| 6,276,606 B1 | 8/2001 | Liou et al. | |
| 6,290,135 B1 | 9/2001 | Acosta et al. | |
| 6,347,163 B2 * | 2/2002 | Roustaei | 382/324 |
| 6,347,742 B2 | 2/2002 | Winarski et al. | |
| 6,493,061 B1 | 12/2002 | Arita et al. | |
| 6,523,750 B1 | 2/2003 | Dickson et al. | |
| 6,536,898 B1 | 3/2003 | Cathey et al. | |
| 6,540,145 B2 | 4/2003 | Gurevich et al. | |
| 6,545,714 B1 * | 4/2003 | Takada | 348/340 |
| 6,568,594 B1 | 5/2003 | Hendriks et al. | |
| 6,616,046 B1 | 9/2003 | Barkan et al. | |
| 6,633,433 B2 | 10/2003 | Bergstein et al. | |
| 6,651,886 B2 | 11/2003 | Gurevich et al. | |
| 6,661,458 B1 | 12/2003 | Takada et al. | |
| 6,674,473 B1 * | 1/2004 | Takada | 348/340 |
| 6,689,998 B1 | 2/2004 | Bremer | |
| 6,732,930 B2 | 5/2004 | Massieu et al. | |
| 7,086,595 B2 * | 8/2006 | Zhu et al. | 235/462.09 |
| 7,204,418 B2 * | 4/2007 | Joseph et al. | 235/454 |
| 7,213,762 B2 | 5/2007 | Zhu et al. | |
| 2002/0070342 A1 * | 6/2002 | Berenz et al. | 250/353 |
| 2002/0134835 A1 * | 9/2002 | Kennedy | 235/384 |
| 2002/0148900 A1 | 10/2002 | Gurevich et al. | |
| 2002/0149693 A1 * | 10/2002 | Tantalo et al. | 348/362 |
| 2002/0154415 A1 | 10/2002 | Miyauchi et al. | |
| 2003/0043463 A1 | 3/2003 | Li et al. | |
| 2003/0107658 A1 * | 6/2003 | Huang et al. | 348/221.1 |
| 2004/0136069 A1 | 7/2004 | Li et al. | |
| 2005/0122422 A1 * | 6/2005 | Kent et al. | 348/371 |
| 2005/0134725 A1 * | 6/2005 | Uenaka et al. | 348/370 |
| 2006/0113386 A1 | 6/2006 | Olmstead | |

OTHER PUBLICATIONS

Jaroszewicz et al., "Lens Axicons: Systems Composed of a Diverging Aberrated Lens and a Perfect Converging Lens," *J. Opt. Soc. Am*, vol. 15, No. 9, Sep. 1998, pp. 2383-2390.

Jaroszewicz et al., "Lens Axicons: Systems Composed of a Diverging Aberrated Lens and a Converging Aberrated Lens," *J. Opt. Soc. Am*, vol. 16, No. 1, Jan. 1999, pp. 191-197.

Smith, *Modern Optical Engineering: The Design of Optical Systems*, 2nd ed., (New York:McGraw Hill, 1990), pp. 20-25, 38-39, 60-63, 70-71, 133-135, 340-359, 416-419, 463-469.

McLeod, "The Axicon: A New Type of Optical Element," *J. Opt. Soc. Am.*, vol. 44, No. 8, Aug. 1954, pp., 592-597.

Sochacki et al., "Nonparaxial Design of Generalized Axicons," *Applied Optics*, vol. 31, No. 25, Sep. 1992, pp. 5326-5330.

Cathey et al., "New Paradigm for Imaging Systems," *Applied Optics*, vol. 41, No. 29, Oct. 2002, pp. 6080-6092.

Kubala et al., "Reducing Complexity in Computation Imaging Systems," CDM Optics, Inc., 2003.

Dowski et al., "Wavefront Coding: Jointly Optimized Optical and Digital Imaging Systems," CDM Optics, Inc., date unknown.

Castro et al., "Asymmetric Phase Masks for Extended Depth of Field," *Applied Optics*, vol. 43, No. 17, Jun. 2004, pp. 3474-3479.

Molecular Expressions™, Optical Microscopy Primer: Digital Imaging in Optical Microscopy, "Introduction," http://micro.magnet.fsu.edu/primer/digitalimaging/index/html, Nov. 9, 2004.

Molecular Expressions™, Optical Microscopy Primer: Digital Imaging in Optical Microscopy, "Introduction to CMOS Image Sensors," http://micro.magnet.fsu.edu/primer/digitalimaging/cmosimagesensors/html, Nov. 9, 2004.

Modulation Transfer Function (no date); downloaded from http://www.mellesgriot.com/glossary/wordlist/glossary details.asp?wID+263, visited May 2005.

Modulation Transfer Function (2003); downloaded from http://www.micro.magnet.fsu/edu/primer/anatomy/mtfhome.html, visited Nov. 2004.

Nikon Microcopy Modulation Transfer Function (no date); downloaded from http://www.microscopyu.com/articles/mtfintro.html, visited Nov. 2004.

Notification of Transmittal of the International Search Report and the Written Opinion of the International Searching Authority, or the Declaration, International Application No. PCT/US06/03158, dated Oct. 26, 2007, 12 pages.

* cited by examiner

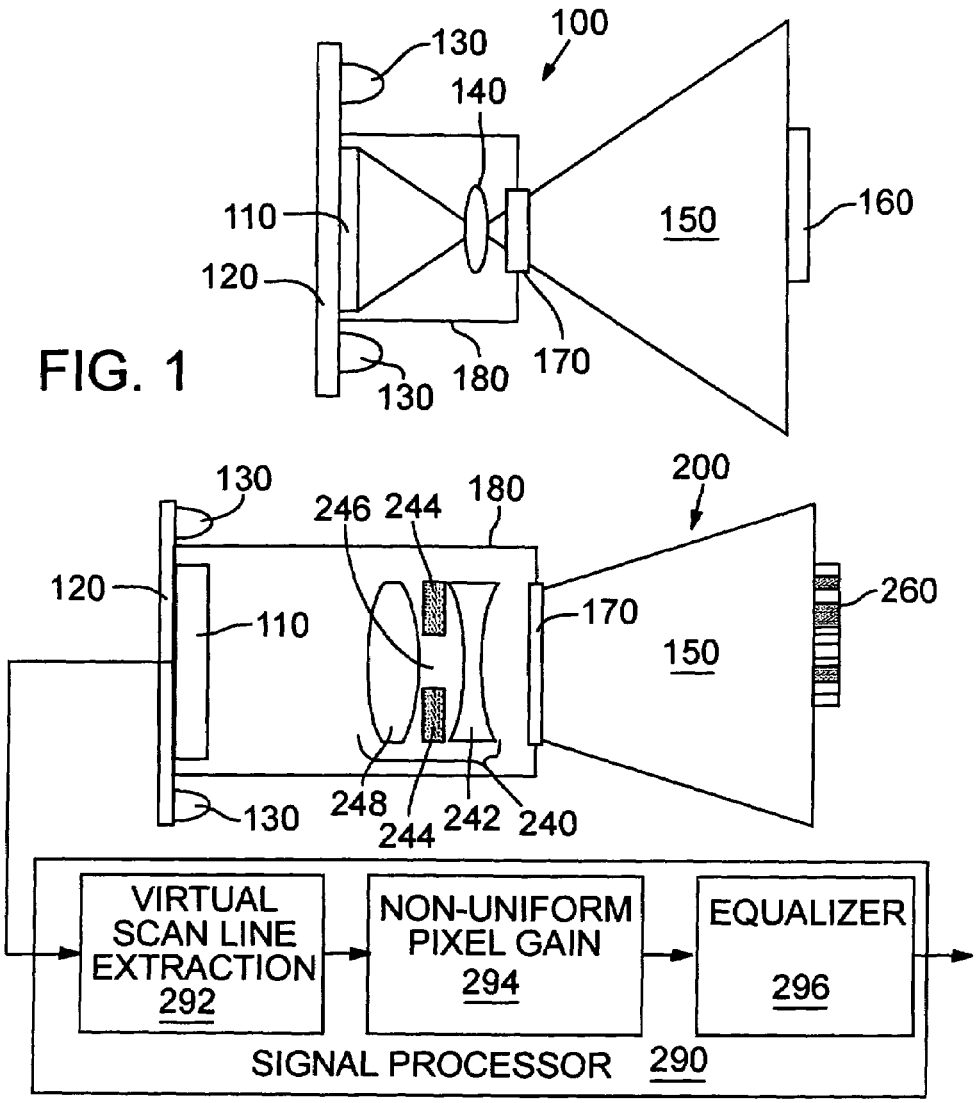

ROLLING-RESET IMAGER WITH OPTICAL FILTER

TECHNICAL FIELD

This application relates generally to optical systems and elements and more particularly to imaging systems, such as those useful for reading bar codes.

BACKGROUND

Common imagers, such as interline transfer charge-coupled devices (IT-CCDs) and certain complementary metal oxide semiconductor (CMOS) cameras, such as so-called 4-T pixel sensors (also known as frame-shuttered imagers), form an electronic image by simultaneously exposing all of its pixel elements to the object to be imaged. To image a moving object with such an imager, a frame shutter can be provided to briefly open and thereby to momentarily expose all of the imager's pixels at the same time, resulting in a "freeze frame" image. The time for which the shutter remains open—the frame exposure time—determines the maximum speed at which the object to be imaged can move while producing an adequate quality image. While mechanical shuttering can facilitate satisfactory imaging of fast moving objects, mechanical shuttering mechanisms adversely affect the complexity, cost, size, weight, power, reliability, and durability of an imaging system.

On the other hand, a rolling-reset imager, such as certain CMOS cameras, forms an image by sequentially activating individual rows of pixels within the pixel grid array, cycling through every row at a rate equal to the imager's frame rate. Each row is exposed for N units of time during each frame, where N specifies the exposure time. This is accomplished by enabling gathering of pixel values for a row N rows before that particular row is to be read out. The readout process clears the row. This method enables the imager to capture images over a wide range of intensity, as each row can be exposed for as little as one unit time and for as long as the entire frame time. An unfortunate consequence of this exposure method is that each row is exposed at a slightly different time. If N=1, for example, then each row exposes sequentially. If a longer exposure time (N>1) is implemented, then each row is staggered by 1/N of the total exposure time. If the imager is trying to capture a moving object, this staggered exposure causes motion artifacts. For example, if a thin vertically oriented object, such as a pencil, moves from left to right in front of such an imager at a sufficiently high speed, the image will be captured as a diagonally oriented pencil, due to the effects of staggered exposure time.

Rolling-reset CMOS imagers are generally less expensive than CCD imagers due to the relative ease of the CMOS process compared to the CCD process, and rolling-reset CMOS imagers are generally less expensive than frame-shuttered CMOS imagers since they typically have fewer transistors per pixel. However, it is challenging to operate a rolling-rest imager in a freeze-frame mode of operation. In order for all pixels to get exposed at the same time, each row must be set up to expose for the entire frame time. This large exposure time causes considerable motion blur effects. A mechanical shutter can be used in conjunction with a full frame exposure, to limit the intrusion of light to a narrow time period, corresponding to the desired exposure time. However, a mechanical shutter can be bulky, expensive, and less reliable than all-electronic means.

SUMMARY

According to one embodiment, an imaging system comprises a rolling-reset imager that forms an image of an object, a light source illuminating the object, and an optical filter disposed between the object and the rolling-reset imager. The pulsed light from the light source has an illumination frequency spectrum and an illumination pulse width defining an effective exposure time for forming the image of the object. The optical filter has a frequency pass band permitting transmission of a significant portion of the illumination frequency spectrum while at least approximately inhibiting transmission of at least some light having frequencies outside the illumination frequency spectrum.

According to another embodiment, a method illuminates an object with illumination light in a given frequency range, so that the illumination light reflects from the object along with background ambient light. The method filters the reflected light so as to attenuate at least some of the background ambient light by a greater attenuation factor than the illumination light. The method forms a pixelized image based on the filtered light on a rolling-reset basis.

Additional details concerning the construction and operation of particular embodiments are set forth in the following sections with reference to the below-listed drawings.

BRIEF DESCRIPTION OF THE DRAWINGS

FIG. 1 is a diagram of an imaging system according to one embodiment.

FIG. 2 is a diagram of a bar code reading system according to another embodiment.

FIG. 3 is a flowchart of an imaging methods according to one embodiment.

DETAILED DESCRIPTION OF EMBODIMENTS

Figure 4:
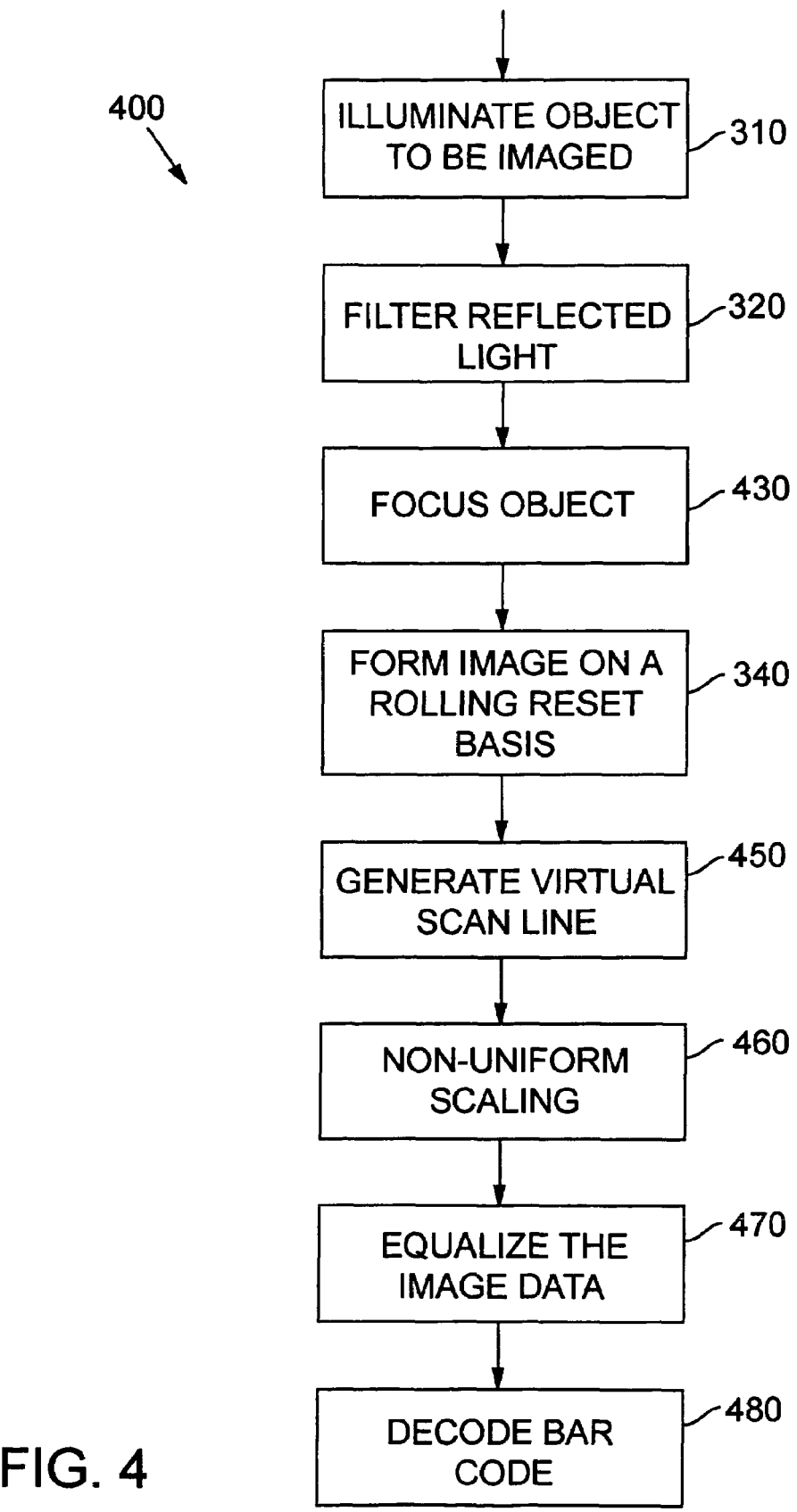
FIG. 4 is a flowchart of a bar code reading method according to one embodiment.

With reference to the above-listed drawings, this section describes particular embodiments and their detailed construction and operation. As one skilled in the art will appreciate in light of this disclosure, certain embodiments are capable of achieving certain advantages over the known prior art, including some or all of the following: (1) enabling the utilization of more economical rolling-reset imagers, such as CMOS rolling-reset imagers; (2) elimination of the need to use a physical shuttering mechanism; (3) suppression of background illumination; and (4) avoidance of visible flickering from the illumination source, which can be discernable and annoying to human observers. These and other advantages of various embodiments will be apparent upon reading the remainder of this section.

FIG. 1 is a diagram of an imaging system 100 according to one embodiment. The imaging system 100 comprises a rolling-reset imager 110, which may be of the CMOS type. The rolling-reset imager 110 is mounted on a printed circuit board 120. The imaging system 100 also comprises one or more light sources 130, which can also be mounted on the printed circuit board 120, as shown. One purpose of the light sources 130 is to provide pulsed illumination to facilitate imaging and to freeze the object motion by defining the exposure time. Any arrangement of any number of light sources can accomplish that goal. The light sources 130 are preferably light emitting diodes (LEDs). The light sources 130 emit light of a wavelength within the sensitivity range of the imager 110, which may be visible light or near infrared (near-IR) light, for example. The use of pulsed LED illumination in the near-IR wavelength range from about 700 nm (nanometers) to about 950 nm may be particularly advantageous in some applications, as discussed below.

Placed in front of the imager 110 is a lens 140, which provides a field of view 150, in which is an object 160 to be imaged. In one use of the imaging system 100, the object 160 is an optical code, such as a bar code. Disposed between the lens 140 and the object 160 is an optical filter 170. An enclosure 180 covers the imager 110 and the lens 140 except where the optical filter 170 is located across the field of view 150, so that all light reaching the imager 110 passes through the optical filter 170, preferably after reflecting off the object 160.

The optical filter 170 ideally has a lowpass, highpass, or bandpass frequency response with a pass band matching as nearly as possible the spectrum of the light generated by the light sources 130. In this way, the object 160 can be imaged by the imager 110 when the light sources 130 are illuminating the object 160 but not when the light sources 130 are not illuminating the object 160. Other light, such as background ambient light, having frequencies outside of the pass band of the optical filter 170, is desirably attenuated by the optical filter 170, preferably to an extent that such other light does not appreciably register at the imager 110. For example, if illumination sources 130 are near-IR LEDs emitting at a wavelength of 850 nm, and the background ambient illumination is fluorescent lighting, having little emission in the near-IR range, useful versions of the optical filter 170 include WRATTEN® #87 IR filter, available from Eastman Kodak Co., Rochester, N.Y.; CR-39® IR longpass filter available from Opticast, Inc., Findlay, Ohio; as well as R-72 IR pass filter, RG715 IR longpass filter, and RT830 bandpass filter, available from various sources such as Edmund Industrial Optics, Barrington, N.J., which passes wavelengths longer than 700 nm with high transmittance.

In use, the imaging system 100 can form freeze-frame images of the object 160 as it moves across the field of view 150. In this mode of operation, the light sources 130 are turned on for a fraction of the imager 110 frame time. The rows of the imager 110 are set to expose for an entire frame time, so that all rows are exposing during the time of the illumination pulse. For bar code reading, the exposure time per frame (and thus the pulse width of the illumination) should satisfy the following relation: $T_{EXP}=U/V$, where U is the (minimum) unit width of a bar or space and V is the maximum velocity at which the bar code can move across the field of view 150.

The light sources 130 can be pulsed or strobed periodically with a pulse rate and duty cycle set to match a desired exposure time. The frame rate of the imager 110 and strobing frequency or pulse rate can be set, within the limits of the imager 110, to satisfy the following relation: $FR_{MIN}=V/(W_F-W_O)$, where $FR_{MIN}$ is the minimum frame rate, V is the velocity at which the bar code moves across the field of view 150, $W_F$ is the width of the field of view 150 in the direction of the velocity, and $W_O$ is the width of the object 160 in the direction of the velocity. Satisfying that relation ensures that the entire object 160 is seen by the imager 110 when it moves through the field of view 150. If the light from the light sources 130 is not visible, then the frame rate can be quite low without generating annoying visible flicker. Visible light pulses at a frequency of about 50 Hertz (Hz) or less can cause a flicker effect that is distracting to the human eye. The use of near-IR illumination is advantageous for another reason as well—namely, that near-IR LEDs are capable of handling significant pulse overdrive currents at low duty cycles, enabling bright illumination for the imager 110. The relatively low frame rate needed to ensure capture of the object 160 allows the illumination LEDs to be pulsed at a very low duty cycle. For example, if the width of field $W_F$ is equal to 5 inches, the width of object $W_O$ is equal to 1 inch, and the maximum object velocity is 50 inches per second, then the minimum frame rate $FR_{MIN}$ is 12.5 frames per second. If the object is a barcode with a minimum element width of 10 mils (0.010 inches), then the maximum exposure time (and therefore LED pulse width) is 200 μs (microseconds). The duty cycle of the LED would then be 200 μs×12.5 Hz or 0.25%, which is quite small. An LED that is rated at 50 mA (milliamps) of continuous duty cycle current may be capable of 1 amp of current when pulsed at this low duty cycle. This increases the effective illumination on the target 160 by a factor of 20.

The optical filter 170 transmits with a relatively high transmittance the illumination generated by the light sources 130 and reflected off the object 160 while transmitting light of other frequencies with a relatively low transmittance. When the light sources 130 operate in the near-IR frequency range and the optical filter 170 has a near-IR pass band, the background ambient lighting is preferably provided by fluorescent lamps, which generate little near-IR energy. In that case, the imaging system 110 effectively discriminates illumination generated by the light sources 130 from background ambient light.

The imaging system 100 is useful in a wide variety of imaging applications. One example of an imaging application suitable for use of the imaging system 100 is reading optical codes, such as a bar code 260. One particular example of a bar code reader utilizing the principles of the imaging system 100 is the bar code imaging system 200 depicted in FIG. 2. The bar code imaging system 200 utilizes a particular lens assembly 240 as well as a signal processor 290 to extract meaningful data from the image of the bar code 260. In particular, the imaging system 200 comprises a lens assembly 240 having rotationally symmetric components comprising a front negative lens 242, followed by a spacer 244, followed by a rear positive lens 248. The spacer 244, which may be a washer or something similar, defines a central aperture 246, preferably circular in shape. The lens assembly 240 permits a more favorable trade-off between depth of field and light collection efficiency. Further details regarding the lens assembly 240 and its components are included in commonly assigned U.S. patent application Ser. No. 11/045,213, entitled "Imaging System with a Lens Having Increased Light Collection and a Deblurring Equalizer," filed Jan. 27, 2005, which is incorporated by reference herein.

The lens assembly 240 preferably has a generalized axicon focus function, as it introduces a rather large amount of spherical aberration. The signal processor 290 is designed to cancel or compensate partially or fully for that aberration or blurriness caused by the lens assembly 240. The signal processor 290 preferably comprises a virtual scan line extraction module 292, a nonuniform pixel gain 294, and an equalizer 296. The virtual scan line extraction module 292, which is optional, reads and/or assembles samples or pixels from the imager 130 lying along one or more lines (i.e., "virtual scan lines") across the image at arbitrary angles or in another desired scan patterns. The nonuniform pixel gain 294, although also optional, can be advantageous in that it can suppress pixel nonuniformity that arises from such causes as differences in gain from pixel to pixel in the imager 110. The nonuniform pixel gain 294 is preferably an array of scale factors that are multiplied by the imager's intensity values on a pixel-by-pixel basis. The equalizer 296 is a filter, such as a digital finite impulse response (FIR) filter, whose transfer function preferably approximates the inverse of the modulation transfer function (MTF) of the lens assembly 240, so as to cancel or compensate for the blurriness or aberration caused by the lens assembly 240. Further details about the signal processor 290 are included in the above-referenced U.S. patent application Ser. No. 11/045,213.

FIG. 3 is a flowchart of an imaging method 300 according to one embodiment. The method 300 illuminates (310) the object to be imaged, preferably with non-visible light, most preferably near-IR light. The illumination light, along with background light, reflect off the object. The method 300 filters (320) the reflected light so as to transmit a significant amount of the reflected illumination light while attenuating to a greater degree other light, such as the ambient background light. On the basis of the light passing through the filter, the method 300 forms (340) an image of the object on a rolling-reset basis.

FIG. 4 is a flowchart of an bar code reading method 400 according to one embodiment. The method 400 performs some of the same steps as the method 300, as indicated by use of the same reference numbers as used in FIG. 3. Moreover, the method 400 focuses (430) the object to be imaged, preferably by means of optical elements, such as the lens 140 or the lens assembly 240, which provides a "soft focus" with extended depth of field and increased light collection efficiency. The filtering step 320 and the focusing step 430 may be performed in the opposite order from what is depicted in FIG. 4. For example, the filter 170 in FIG. 1 or 2 may be placed before or after the lens 140 or the lens assembly 240, respectively. The method 400 may also generate (450) a virtual scan line across the image, scale (460) the virtual scan line signal to compensate for nonuniformity in the background brightness level, and equalize (470) the resulting signal to compensate for aberration introduced by the focusing optics. Finally, the method 400 decodes (480) the bar code on the basis of the image formed at step 340 and any subsequent signal processing of the image data.

The methods and systems illustrated and described herein can exist in a variety of forms both active and inactive. For example, the signal processor 290 and the methods 300 and 400 can exist as one or more software programs comprised of program instructions in source code, object code, executable code or other formats. Any of the above formats can be embodied on a computer-readable medium, which include storage devices and signals, in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer-readable signals, whether modulated using a carrier or not, are signals that a computer system hosting or running a computer program can be configured to access, including signals downloaded through the Internet or other networks. Concrete examples of the foregoing include distribution of software on a CD ROM or via Internet download. In a sense, the Internet itself, as an abstract entity, is a computer-readable medium. The same is true of computer networks in general.

The terms and descriptions used above are set forth by way of illustration only and are not meant as limitations. Those skilled in the art will recognize that many variations can be made to the details of the above-described embodiments without departing from the underlying principles of the invention. The scope of the invention should therefore be determined only by the following claims—and their equivalents—in which all terms are to be understood in their broadest reasonable sense unless otherwise indicated.

The invention claimed is:

1. An imaging system comprising:
   a rolling-reset imager having a field of view, the field of view including a width extending in a direction that a moving object moves, the rolling-reset imager forming an image of the moving object when the object moves through the width of the field of view extending in the direction the object moves, the rolling-reset imager including image sensor pixels, the rolling-reset imager having a minimum frame rate based on the velocity at which the object moves, the width of the field of view in the direction the object moves, and the width of the object in the direction the object moves;
   a light source illuminating the object with pulsed light having an illumination frequency spectrum and an illumination pulse width, the pulse width defining an effective exposure time for forming the image of the object; and
   an optical filter disposed between the object and the rolling-reset imager, the optical filter having a frequency pass band permitting transmission of a significant portion of the illumination frequency spectrum while at least partially inhibiting transmission of at least some light having frequencies outside the illumination frequency spectrum.

2. An imaging system as set forth in claim 1, wherein the rolling-reset imager is a CMOS rolling-reset imager.

3. An imaging system as set forth in claim 1, wherein the light source comprises an LED.

4. An imaging system as set forth in claim 1, wherein the light source is pulsed periodically at a pulse rate equal to a frame rate at which the rolling-reset imager operates.

5. An imaging system as set forth in claim 4, wherein the frame rate is about 50 frames per second or less.

6. An imaging system as set forth in claim 1, wherein the light source is pulsed periodically with a duty cycle that is approximately 0.25%.

7. An imaging system as set forth in claim 1, wherein the illumination frequency spectrum contains predominantly non-visible frequencies.

8. An imaging system as set forth in claim 7, wherein the illumination frequency spectrum contains predominantly near-infrared frequencies.

9. An imaging system as set forth in claim 8, wherein the illumination frequency spectrum contains major components within a wavelength range from about 700 nm to about 950 nm.

10. An imaging system according to claim 1, wherein the object is an optical code.

11. An imaging system according to claim 10, wherein the optical code is a bar code.

12. An imaging system as set forth in claim 1, wherein the effective exposure time is sufficiently small so that the motion of the object does not cause appreciable blurring of the image.

13. An imaging system as set forth in claim 12, wherein the illumination pulse width is equal to the result of dividing the minimum element width in the direction the object moves by the maximum velocity of the object.

14. An imaging system as set forth in claim 1, further comprising:
   a rotationally symmetric lens assembly disposed between the imager and the object, the lens assembly comprising a front negative lens, a rear positive lens, and an aperture positioned between the front and rear lenses, the lens assembly providing an extended depth of field for a given lens aperture size, whereby the lens assembly causes aberration compared to a well-focused lens; and an equalizer connected to the imager, wherein the equalizer at least partially compensates image data for the aberration caused by the rotationally symmetric lens assembly.

15. An imaging system as set forth in claim 1, wherein the rolling-reset imager is set to have at least substantially all imager sensor pixels in an exposed state for the duration of each illumination pulse.

16. An imaging system as set forth in claim 1, wherein the rolling-reset imager has a minimum frame rate that equals $V/(W_F - W_O)$, where V is the velocity at which the object moves, $W_F$ is the width of the field of view in the direction the object moves, and $W_O$ is the width of the object in the direction the object moves.

17. A method for imaging a moving object having multiple elements, where there is a minimum width in the direction the object moves defined by at least one of the elements, comprising:

a first step of setting substantially all image sensor pixels of a rolling-reset imager in an exposed state;

illuminating an object with illumination light in a given frequency range, the illumination duration based on the minimum element width in the direction the object moves and the maximum velocity of the object, reflected light being created by the illumination light reflecting from the object along with background ambient light;

filtering the reflected light so as to attenuate at least some of the background ambient light by a greater attenuation factor than the illumination light; and forming a pixelized electronic representation of the moving object based on the filtered light on a rolling-reset basis.

18. A method as set forth in claim 17, wherein the given frequency range is predominantly near-infrared.

19. A method as set forth in claim 17, wherein the rolling-reset imager has a field of view with a width extending in the direction the object moves, and the illuminating step comprises:

periodically strobing the illumination light at a strobing frequency equal to a frame rate at which the rolling-reset image is formed, the frame rate having a minimum frame rate based on the velocity at which the object moves, the width of the field of view in the direction the object moves, and the width of the object in the direction the object moves.

20. A method as set forth in claim 19, wherein strobing the illumination light creates on pulses and off pulses, the on pulses each defining an effective exposure time for forming an image.

21. A method as set forth in claim 17, further comprising:

passing the filtered light through a lens assembly, thereby causing the object to be imaged with increased aberration; and equalizing the data representing the image so as to at least partially compensate for the aberration introduced by the lens assembly.

22. A method as set forth in claim 21, wherein the passing step comprises:

passing the reflected light through a positive lens;

blocking the light from a periphery region of the positive lens while not blocking the light from a central aperture region of the positive lens; and passing the light from the central aperture region of the positive lens through a negative lens.

23. A method as set forth in claim 17, wherein the illumination duration is equal to the result of dividing the minimum element width in the direction the object moves by the maximum velocity of the object.

24. A method as set forth in claim 17, wherein the frame rate has a minimum frame rate equaling $V/(W_F - W_O)$, where V is the velocity at which the object moves, $W_F$ is the width of the field of view in the direction the object moves, and $W_O$ is the width of the object in the direction the object moves.

25. A system comprising:

a means for illuminating with illumination light in a given frequency range a moving object having elements, where there is a minimum width in the direction the object moves defined by at least one element, so that reflected light is created by the illumination light reflecting from the object elements along with background light, and the illumination light duration defines an effective exposure time for forming an image of the object, the exposure time being equal to the result of dividing the minimum element width in the direction the object moves by the maximum velocity of the object;

a means for creating filtered light by filtering the reflected light so as to attenuate at least some of the background light by a greater attenuation factor than the illumination light; and a means for forming an electronic image based on the filtered light, the means for forming an electronic image having a field of view, the field of view including a width extending in the direction that the object moves, the image comprising pixels arranged in rows that reset on a rolling basis, and the means for forming an electronic image having a minimum frame rate equaling $V/(W_F - W_O)$, where V is the velocity at which the object moves, $W_F$ is the width of the field of view in the direction the object moves, and $W_O$ is the width of the object in the direction the object moves.

* * * * *